United States Patent [19]

Aikawa et al.

[11] Patent Number: 4,878,743
[45] Date of Patent: Nov. 7, 1989

[54] AUTOMOTIVE MIRROR USING ELECTROCHROMIC ELEMENT

[75] Inventors: Toyoshi Aikawa, Ageo; Eiichi Sekine, Higashimurayama, both of Japan

[73] Assignee: Ichikoh Industries Limited, Tokyo, Japan

[21] Appl. No.: 203,139

[22] Filed: Jun. 7, 1988

[30] Foreign Application Priority Data

Jun. 8, 1987 [JP] Japan ................................ 62-141492

[51] Int. Cl.⁴ ........................... G02F 1/17; G02F 1/23
[52] U.S. Cl. .................................................... 350/357
[58] Field of Search ............... 350/353, 355, 357, 356; 340/785

[56] References Cited

U.S. PATENT DOCUMENTS

| | | | |
|---|---|---|---|
| 4,768,865 | 9/1988 | Greenberg et al. | 350/357 |
| 4,801,195 | 1/1989 | Kawa et al. | 350/357 |
| 4,805,996 | 2/1989 | Carlson | 350/357 |

Primary Examiner—Eugene R. LaRoche
Assistant Examiner—Nathan McCutcheon
Attorney, Agent, or Firm—Foley & Lardner, Schwartz, Jeffery, Schwaab, Mack, Blumenthal & Evans

[57] ABSTRACT

In an automotive mirror using an electrochromic element, the electrochromic element comprises a first electrode made of a transparent conductive layer laminated on a substantially rectangular glass substrate, two EC (electrochromic) layers disposed opposing each other with a solid electrolyte layer placed between them, a second electrode made of a reflective metal film and an insulative/protective layer disposed outside the second electrode. There are formed on the first electrode longitudinally and laterally in positions off the adjoining EC layer, strip-shaped metal films considerably superior in conductivity to the first electrode. The power supply to the first electrode is made through a pair of terminal fixtures electrically connected to the strip-shaped metal films in locations near a set of diagonally opposing corners of the glass substrate, and the power supply to the second electrode is made to another pair of terminal fixtures electrically connected to a pair of electrode portions extended to the insulative areas, respectively, near the other set of diagonally opposing corners of the glass substrate. Therefore, at start of the power supply, the voltage drop depending upon the position on the first electrode is markedly reduced, and the colored areas of the two EC laters can quickly shift to the center of the mirror surface from the regions near the strip-shaped metal films, whereby the entire mirror surface can get colored to a predetermined extent in a considerably reduced time.

3 Claims, 4 Drawing Sheets

AUTOMOTIVE MIRROR USING ELECTROCHROMIC ELEMENT

BACKGROUND OF THE INVENTION (a) Field of the Invention

The present invention relates to an automotive mirror in which an electrochromic element is used, and more particularly to an automotive mirror of which the surface coloration is variable in response to a variation of the voltage applied to the electrochromic element, so-called "nonglaring mirror", of which almost the entire surface can quickly take a predetermined colored state.

(b) Related-art Statement

The automotive mirror which provides the driver of a car with a view behind him is indispensable for safe driving. However, in case one drives in dark, the light from the head lights of a following car will possibly be reflected by the rear view mirror of his car and dazzle him. To reduce such glaring or dazzling light, it has been proposed to color the mirror surface, thereby reducing the reflectance of the mirror when a strong light beam from the head lights of a following car is incident upon the rear view mirror of a car running ahead of the car in the dark, especially, at night. Heretofore, non-glaring mirrors using a prism or liquid crystal have been proposed but they do not fully meet the requirements for the automotive rear view mirrors because of their visibility, difficulty of manufacturing a mirror surface specially curved as required for the automotive rear view mirrors and for some other reasons. Recently, however, an automotive mirror employing an electrochromic element for adjusting the coloration, that is, reflectance, of the mirror surface has been proposed for overcoming the disadvantages of the conventional nonglaring mirrors. The mirror of this type utilizes the fact that the electrochromic element is colored or decolored depending upon the change in orientation of an electric field applied thereto.

FIG. 1 is a schematic, partially fragmentary view of a mirror formed using an ordinary electrochromic element. The electrochromic element may be composed of a transparent conductive layer 2 (formed by a material such as ITO (indium tin oxide) or $SnO_2$ and composing a first electrode) laminated on one side of a glass substrate 1 so formed as to have an appropriate curvature, a first EC (electrochromic) layer 3 made of a solid electrochromic substance such as $WO_3$, $MoO_3$ or the like which colors when deoxidized and which is laminated on the transparent conductive layer 2, a solid electrolyte layer 4 (made of a material such as $Ta_2O_5$, $ZrO_2$, $SiO_2$ or the like) laminated on the first EC layer 3, a second EC layer 5 made of a solid electrochromic substance such as $Cr_2O_3$, NiO, $IrO_2$ or the like which colors when oxidized and which is laminated on the solid electrolyte layer 4, a second electrode/reflective layer 6 made of a material such as Al, Ag or the like and which is laminated on the second EC layer 5, and a protective layer 7 formed on the second electrode 6 and which is electrically insulative. When a negative DC voltage is applied to the first EC layer 3 through the first electrode 2 of such electrochromic element while a positive DC voltage is applied to the second EC layer 5 through the second electrode 6, an electrochemical deoxidation and oxidation take place in the first and second EC layers 3 and 5, respectively, and the first EC layer 3 is colored light blue in case it is made of $WO_3$ and the second EC layer 5 is colored light brown in case it is made of $Cr_2O_3$. When DC voltages opposite in polarity, respectively, are applied to the EC layers 3 and 5, respectively, reverse electrochemical reactions take place in them, respectively, thereby decoloring them. Based on this principle, the optical reflectance of the mirror surface is adjusted, according to the brightness of the environment, to a lower one when the EC layers are colored, and to the initial one when the EC layers are decolored. The first and second electrodes described in the above are so formed as to have nearly a same shape as or a somewhat smaller shape than the mirror surface, for example, a rectangular shape of about 10 cm by 15 cm. Normally, when a DC voltage of about 0.5 to 2.0 volts is applied between the first and second electrodes, a relatively large current of, for example, 0.8 to 1.0 A, flows for a few seconds because the initial resistance of the first and second EC layers 3 and 5 is relatively low, so that an electrochemical deoxidation and oxidation take place in the first and second EC layers 3 and 5, respectively, while the resistance of each EC layer increases gradually as the charged electricity is accumulated. The lead terminals connecting the layers composing the square electrodes and the positive or negative DC source are so designed as to be led out from a relatively small area at the periphery of each electrode, but each layer forming the electrode has a rather wide area as compared with the lead terminal lead-out portion. Hence, for connection of each electrode to the positive or negative DC source, the current density is small at a position far from each lead terminal and among others, the potential distribution is not uniform on the surface of the transparent electrode 2. This is because the transparent electrode 2 is made of a material such as ITO of which the surface electrical resistance is relatively high, for example, about 20 ohms/$cm^2$, and the thickness of the electrode may not be more than a predetermined value because of the necessary appropriate transparency, manufacturing costs and adhesion to other adjoining layers. So, the voltage drop is small at a portion near each lead terminal while being large at a portion away from the terminal. Thus, since the degree of coloration of the first and second EC layers 3 and 5 is low in proportion to the distance from each lead terminal, it takes time until the entire mirror surface gets evenly colored after the connection between each electrode and the positive or negative DC source or until the entire mirror surface is evenly decolored after the disconnection between the electrode and positive or negative DC source.

SUMMARY OF THE INVENTION

The present invention seeks to provide an automotive nonglaring mirror of which the entire surface can get evenly colored in an extremely short time.

The present invention has another object to provide an automotive nonglaring mirror of which the colored area shifts quickly from the periphery to the center thereof so that the entire mirror surface attains a predetermined coloration.

The above-mentioned objects can be accomplished by providing an automotive nonglaring mirror using an electrochromic element comprising, according to the present invention, a generally rectangular glass substrate having four corners, a first transparent electrode layer formed on the glass substrate with portions of a set of corners diagonally opposing each other among the four corners being left uncovered for a pair of insulative portions, strip-shaped metal films formed longitudinally and laterally, respectively, on the first electrode layer and made of a material of a rather high electric conductivity in comparison to the first electrode layer, a first EC (electrochromic) layer located inside the metal films and formed as a laminate on the first electrode layer, an electrolyte layer formed on the first EC layer, a second EC layer formed on the electrolyte layer, a second electrode layer having a portion extended to the pair of insulative portions, formed on the second EC layer and having a light reflective action, a pair of first terminal fixtures secured near the corners in a set among the four corners of the glass substrate and electrically connected to the metal films, a pair of second terminal fixtures secured near the corners in another set of corners among the four corners of the glass substrate and electrically connected to the extended portion of the second electrode layer, and an insulative and protective layer insulating the exposed surface of the second electrode layer, whereby the voltage drop depending upon the position on the first electrode layer at the time of switching can be considerably reduced since the power supply to the transparent first electrode is made directly to the metal films formed longitudinally and laterally of the first electrode layer and the time taken for the entire mirror surface to get a predetermined degree of coloration since the colored areas of the first and second EC layers shift quickly from the locations of the metal films to the mirror surface center.

These and other objects and advantages of the present invention will be better understood from the ensuing description made by way of example of the preferred embodiment with reference to the drawings.

BRIEF DESCRIPTION OF THE DRAWINGS

FIGS. 2 thru 10 show one embodiment of an automotive non-glaring mirror using the EC element according to the present invention, of which FIG. 2 is a rear view of the mirror body including the EC element;

FIG. 3 is a sectional view taken along the line III—III in FIG. 2;

FIG. 4 is a sectional view taken along the line IV—IV of FIG. 2;

FIG. 5 is a sectional view taken along the line V—V of FIG. 2;

FIGS. 6 thru 9 are drawings intended for explanation of the order in which the thin layers composing the mirror are formed and the connection among the layers; and FIG. 10 is a circuit diagram for actuating the automotive nonglaring mirror shown in FIG. 2.

DETAILED DESCRIPTION OF THE PREFERRED EMBODIMENT

Figure 1:
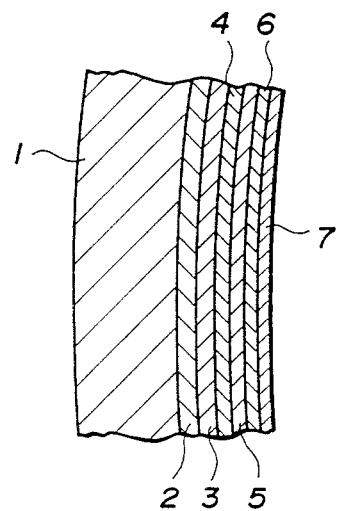
FIG. 1 is a schematic sectional view of a portion of the mirror surface of an automotive nonglaring mirror using the conventional EC element.
Figure 2:
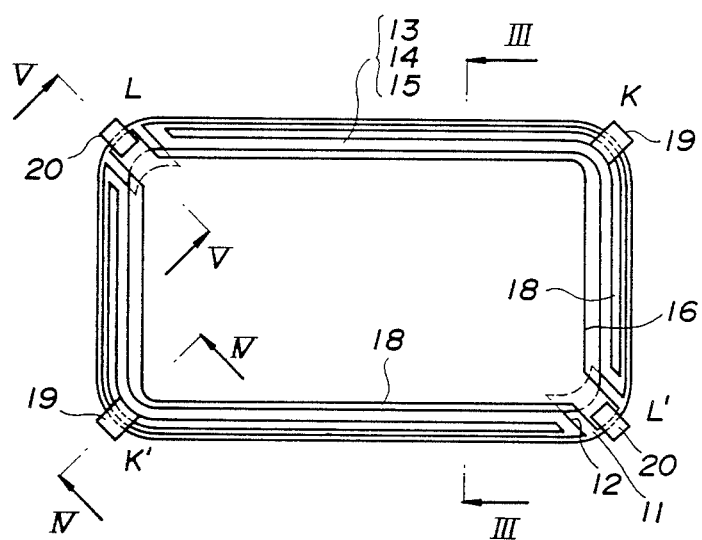
Figure 3:
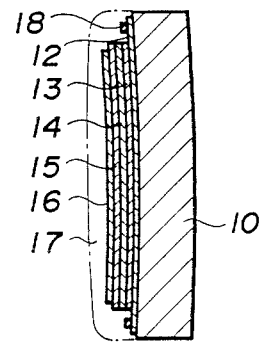
Figure 6:
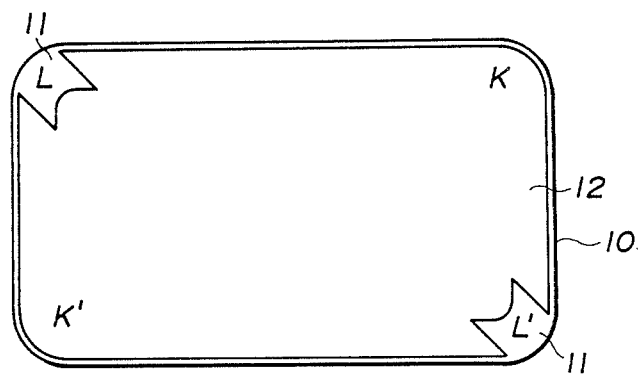
Figure 7:
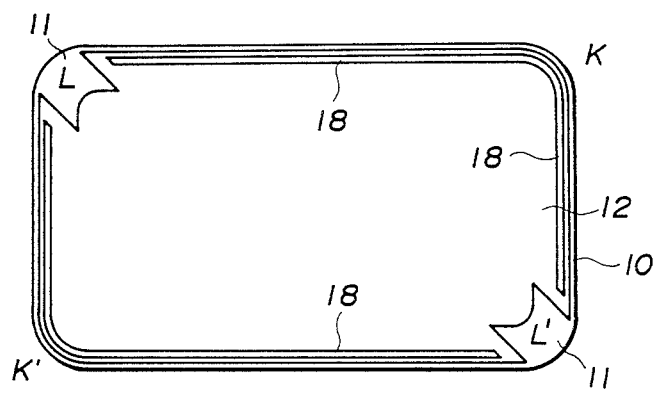
Figure 8:
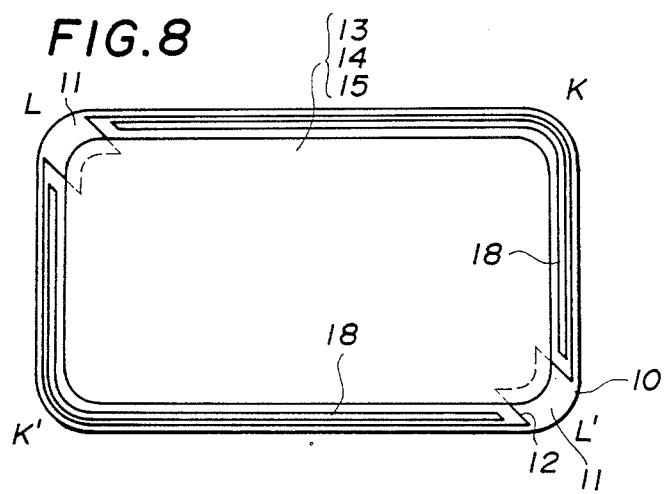
Figure 9:
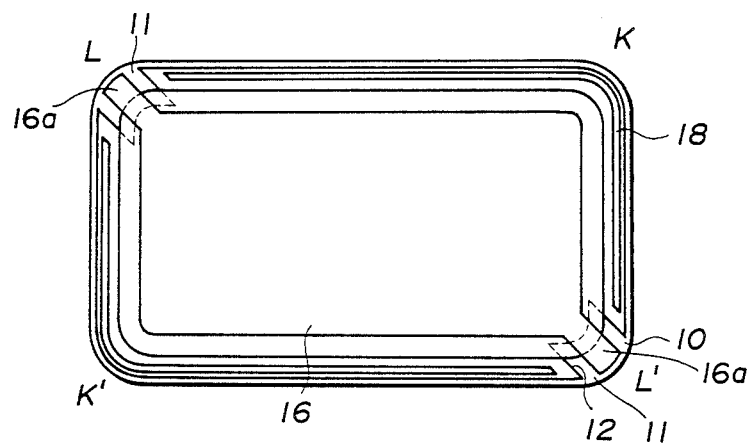

In FIG. 2, the reference numeral 10 indicates a glass substrate taking the outermost or front position of the mirror and of which the rear side is shown in the drawing. This glass substrate 10 is formed essentially as a rectangle. For use of the mirror as a rear view mirror, the glass substrate has the rear surface formed a little concave. As shown also in FIG. 6, the glass substrate 10 has a first electrode 12 composed of a transparent conductive layer formed on the rear side thereof, the first electrode 12 being cut at a set of corners diagonally opposed to each other and indicated by reference symbols L and L'. That is to say, there are formed insulative areas 11 adjoining the portions, respectively, of the set of corners diagonally opposing each other of the glass substrate 10 and also of the first electrodes 12. The transparent first electrode 12 should preferably be made of a material of as low electrical resistance as possible. It is formed from, for example, an ITO film of about 20 ohms/cm$^2$ in surface electrical resistance. Further, strip-shaped metal films 18 are formed along the periphery of and on the first electrode 12. The metal films 18 are formed as a pair of L-shaped conductive paths terminating near the insulative areas 11, respectively, of the pair of diagonally opposing corners L and L' as shown in FIG. 7. The thickness and width of the metal films 18 are preselected for secure adhesion to the transparent first electrode 12. According to this embodiment, the metal film is made of an aluminum film of 1 $\mu$m in thickness and 1 mm in width, and it has a surface electrical resistance of about $10^{-3}$ ohms/cm$^2$. The surface electrical resistance of the metal films is lower about $10^4$ times than that of the first electrode 12. However, the material of the metal films is not limited to the aluminum film but may be any metallic material such as silver which has a sufficiently low electrical resistance. As shown in FIG. 8, there is formed in an area surrounded by the metal films 18 on the first electrodes 12, namely, the two L-shaped electrically conductive paths, a first EC layer 13 in a position off the metal films 18, namely, inside the metal films. The first EC layer 13 is formed as attached nearly wholly to the first electrode 12 while parts thereof are formed as attached to the insulative areas 11, respectively. There are formed an electrolyte layer 14 on the first EC layer 13 and then a second EC layer 15 on the electrolyte layer 14, all in nearly same areas. According to this embodiment, the first EC layer 13 is made of $WO_3$ which colors light blue when electrochemically deoxidized, and the second EC layer 15 is of $Cr_2O_3$ which colors light brown when electrochemically oxidized. However, the first EC layer 13 may be made of $MoO_3$ which colors when electrochemically deoxidized, and the second EC layer 15 may be of any other material such as NiO or $IrO_2$ which colors when electrochemically oxidized. As shown in FIG. 9, the second EC layer 15 has formed as attached thereon a second electrode 16 of a smaller area. The portions near a set of diagonally opposing corners of the second EC layer 15 are extended to the insulative areas 11, respectively, on the glass substrate 10 to form connectors 16a for connection to the lead wire lead-out portions which will be described later. This second electrode 16 also serves as reflective layer, and it should preferably be made of a material such as aluminum or silver. The substantially rectangular surface portion of the glass substrate 10 of which the area is somewhat narrower than that of the second electrode 16 works as a mirror surface.

Figure 4:
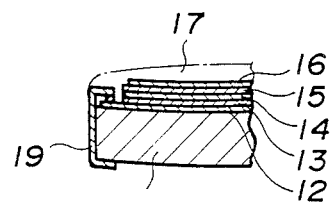
Figure 5:
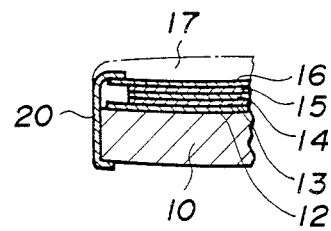
Figure 10:
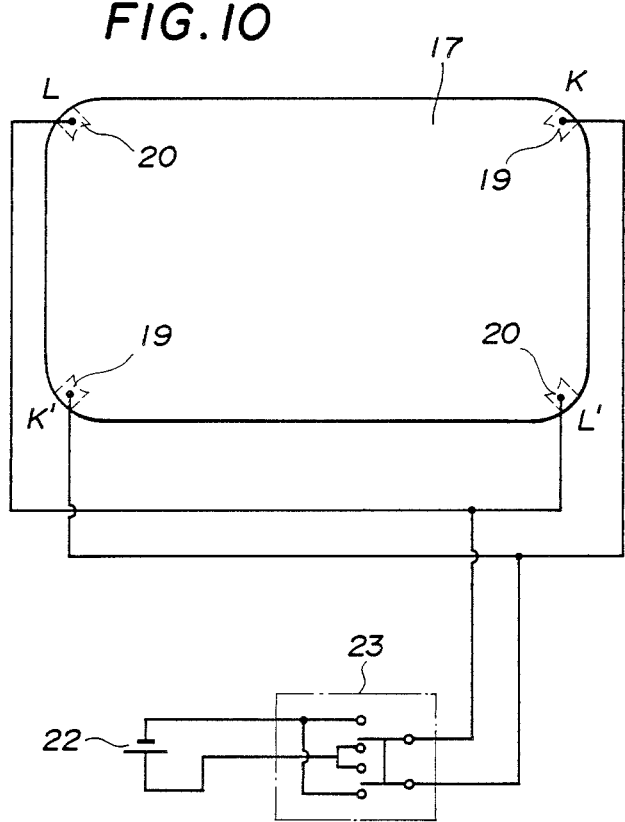

The first electrode 12 and second electrode 16 are so formed as to be connected to the positive or negative polarity of a DC source 22 as switched by a changeover switch 23 as shown in FIG. 10. As shown in FIGS. 2 and 4, a pair of generally C-shaped conductive terminal fixtures 19 disposed near another set of corners K and K', respectively, diagonally opposing each other of the glass substrate 10 each form a lead-out portion for the lead wire from the first electrode 12. With one end thereof held in contact with the metal film 18 on the first electrode 12 and the other end in contact with the glass substrate 10, the terminal fixtures 19 are secured as calked with an appropriate force to the glass substrate 10. The set of terminal fixtures 19 form each an electric path to the first electrode 12. The current from the DC source 22 is branched by these electric paths, but since the resistance of the metal films 18 is very low, the potential distribution in areas along the metal films 18 on the first electrode 12 is generally uniform. Also, the lead-out portions for the lead wires from the second electrode 16 are formed by a pair of generally C-shaped conductive terminal fixtures 20 disposed near the pair of corners L and L' diagonally opposed to each other of the glass substrate 10. Also with one end thereof held in contact with the connectors 16a extended from the second electrode 16 having been described above and the other end in contact with the glass substrate 10, the terminal fixtures 20 are secured as calked with an appropriate force to the glass substrate 10. These terminal fixtures 19 and 20 are disposed as aesthetically well balanced near the four corners of the glass substrate 10 and have a minimum portion exposed on the mirror surface. Also on the rear side of the mirror, the rear surface of the second electrode 16 and the exposed portions of the layers include the terminal fixtures and are covered by the insulative/protective layer 17.

The above-mentioned first electrode 12, metal film 18, first EC layer 13, electrolyte layer 14, second EC layer 15 and the second electrode 16 can be formed by ordinary thin film deposition process such as evaporation, sputtering, ion plating, etc.

In the above-mentioned automotive mirror according to the present invention, the power supply to the first electrode 12 is made directly to the L-shaped metal film 18 through the terminal fixtures 19 disposed near the set of corners K and K' among the four corners of the glass substrate 10, and the power supply to the second electrode 16 is made through the terminal fixtures 20 disposed near the other set of corners L and L' among the four corners of the glass substrate 10, so that even if a relatively large current flows through the metal film 18 on the first electrode 12 at the time of switching, the thermal influence on the terminal fixtures 19 and 20, adjoining EC layers and the electrolyte layer is small since the resistance of the metal film is extremely low and also the voltage drop can be made negligibly small. Hence, it will be apparent to those skilled in the art from the foregoing description that at the time of switching, the EC layers adjoining the metal film 18 first color dark, namely, the periphery of the glass substrate 10 colors dark, and the colored area quickly shifts toward the center of the glass substrate 10 from the four directions, whereby the entire mirror surface can get uniformly colored in a short time.

As described in the foregoing, with the automotive mirror using the EC element according to the present invention, it is possible to remarkably reduce the nonuniformity of the voltage to be applied to the two EC layers depending upon the position on the electrodes, thereby quickly attaining a uniform coloration over the entire mirror surface. Thus, the automotive mirror according to the present invention can contribute to the safe driving of a car. Also since the terminal fixtures are disposed at the four corners respectively, of the mirror, they no not appear on the front side of the mirror, have no influence on the visibility of the mirror and are asthetically well balanced.

What is claimed is:

1. An automotive nonglaring mirror using an electrochromic element, comprising:
    a generally rectangular glass substrate having four corners;
    a first transparent electrode layer formed on said glass substrate with portions of a set of corners diagonally opposing each other among said four corners being left uncovered for a pair of insulative portions;
    strip-shaped metal films formed longitudinally and laterally, respectively, on the first electrode layer and made of a material of a rather higher electric conductivity than said first electrode layer;
    a first EC (electrochromic) layer located inside said metal films and formed as laminated on said first electrode layer;
    an electrolyte layer formed on said first EC layer;
    a second EC layer formed on said electrolyte layer;
    a second electrode layer having a portion extended to said pair of insulative portions, formed on said second EC layer and having a light reflective action;
    a pair of first terminal fixtures secured near the corners in a set among the four corners of said glass substrate and electrically connected to said metal films;
    a pair of second terminal fixture secured near the corners in another set among the four corners of said glass substrate and electrically connected to the extended portion of said second electrode layer; and
    an insulative and protective layer insulating the exposed surface of said second electrode layer.

2. An automotive nonglaring mirror according to claim 1, said metal films taking the form of a pair of L-shaped conductive paths formed longitudinally and laterally on said first electrode layer.

3. An automotive nonglaring mirror according to claim 2, said metal films being made of aluminum.

* * * * *